(12) United States Patent
Hamakawa

(10) Patent No.: US 9,977,933 B2
(45) Date of Patent: May 22, 2018

(54) ELECTRONIC DEVICE SUITABLE FOR WRITING INFORMATION TO WIRELESS TAGS AND INFORMATION UPDATE METHOD

(71) Applicant: KYOCERA Document Solutions Inc., Osaka (JP)

(72) Inventor: Takeshi Hamakawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days. days.

(21) Appl. No.: 15/731,169

(22) Filed: Apr. 26, 2017

(65) Prior Publication Data
US 2017/0330002 A1 Nov. 16, 2017

(30) Foreign Application Priority Data
May 13, 2016 (JP) .................................. 2016-096930

(51) Int. Cl.
| | |
|---|---|
| *G06K 7/08* | (2006.01) |
| *G06K 7/10* | (2006.01) |
| *G06K 19/07* | (2006.01) |
| *H04B 5/00* | (2006.01) |
| *H04N 1/00* | (2006.01) |

(52) U.S. Cl.
CPC ..... *G06K 7/10297* (2013.01); *G06K 19/0723* (2013.01); *H04B 5/0056* (2013.01); *H04N 1/00244* (2013.01); *H04N 2201/006* (2013.01); *H04N 2201/0094* (2013.01)

(58) Field of Classification Search
CPC . G06K 7/08; G06K 19/00; G06K 7/00; G06F 17/00
USPC .................................. 235/451, 375, 487, 439
See application file for complete search history.

(56) References Cited

U.S. PATENT DOCUMENTS

| | | | |
|---|---|---|---|
| 2010/0069008 A1* | 3/2010 | Oshima ................... | H04W 4/02 455/41.3 |
| 2013/0235422 A1 | 9/2013 | Nakata | |
| 2014/0235162 A1* | 8/2014 | Gallo ................ | H04W 52/0229 455/41.1 |
| 2014/0268203 A1* | 9/2014 | Saotome ............ | H04N 1/00408 358/1.13 |

FOREIGN PATENT DOCUMENTS

JP 2013-186824 A 9/2013

\* cited by examiner

*Primary Examiner* — Edwyn Labaze
(74) *Attorney, Agent, or Firm* — Hawaii Patent Services; Nathaniel K. Fedde; Kenton N. Fedde

(57) ABSTRACT

Provided is an electronic device that increases operability when writing information (for example, unique user information) that allows writing to a wireless tag from the outside. The electronic device of the present disclosure includes a storage device that stores first registered information; a wireless tag that stores second registered information; and a system-control unit that updates contents of the second registered information based on the first registered information; wherein the system-control unit updates contents of information other than information that allows writing when there is writing to the wireless tag from the outside.

8 Claims, 8 Drawing Sheets

FIG.3A

WHEN MFP SIDE INDICATES MAIN UNIT PRIORITY (A) NFC TAG REGISTERED INFORMATION
(B) MFP SIDE REGISTERED INFORMATION
(C) INFORMATION MANAGEMENT OF NFC TAG

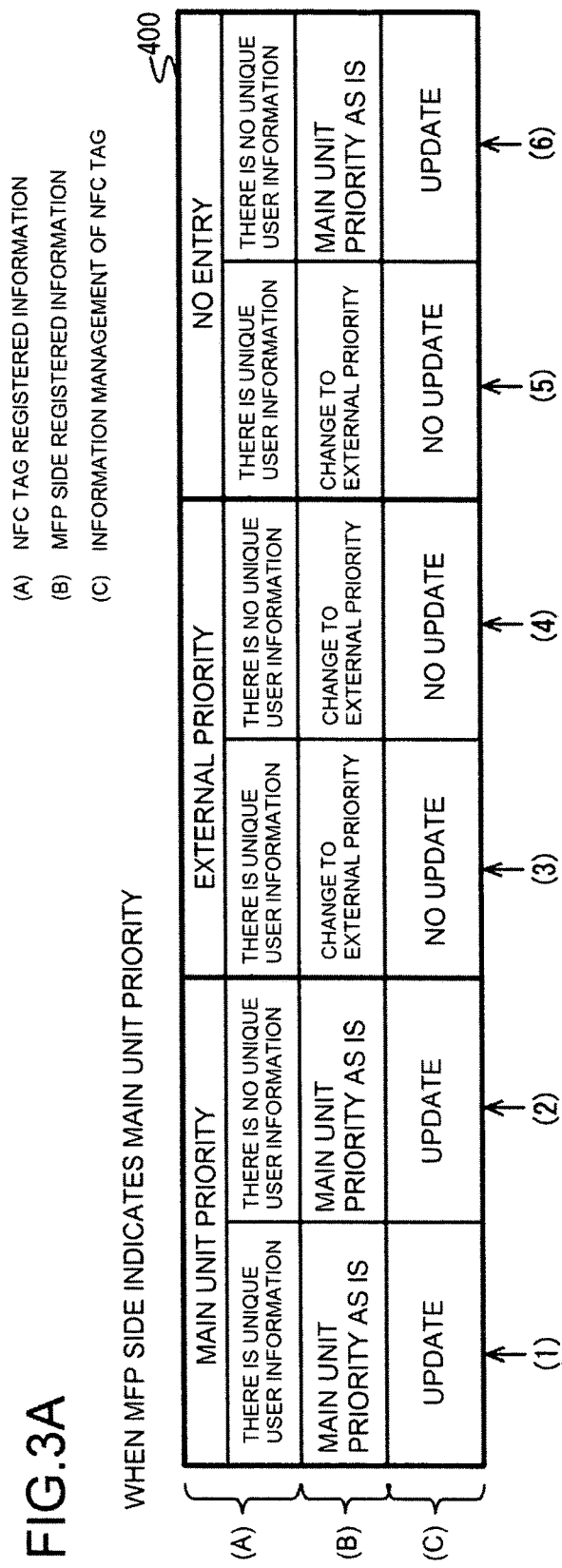

|  | MAIN UNIT PRIORITY | | EXTERNAL PRIORITY | | NO ENTRY | |
|---|---|---|---|---|---|---|
| (A) | THERE IS UNIQUE USER INFORMATION | THERE IS NO UNIQUE USER INFORMATION | THERE IS UNIQUE USER INFORMATION | THERE IS NO UNIQUE USER INFORMATION | THERE IS UNIQUE USER INFORMATION | THERE IS NO UNIQUE USER INFORMATION |
| (B) | MAIN UNIT PRIORITY AS IS | MAIN UNIT PRIORITY AS IS | CHANGE TO EXTERNAL PRIORITY | CHANGE TO EXTERNAL PRIORITY | CHANGE TO EXTERNAL PRIORITY | MAIN UNIT PRIORITY AS IS |
| (C) | UPDATE | UPDATE | NO UPDATE | NO UPDATE | NO UPDATE | UPDATE |
|  | (1) | (2) | (3) | (4) | (5) | (6) |

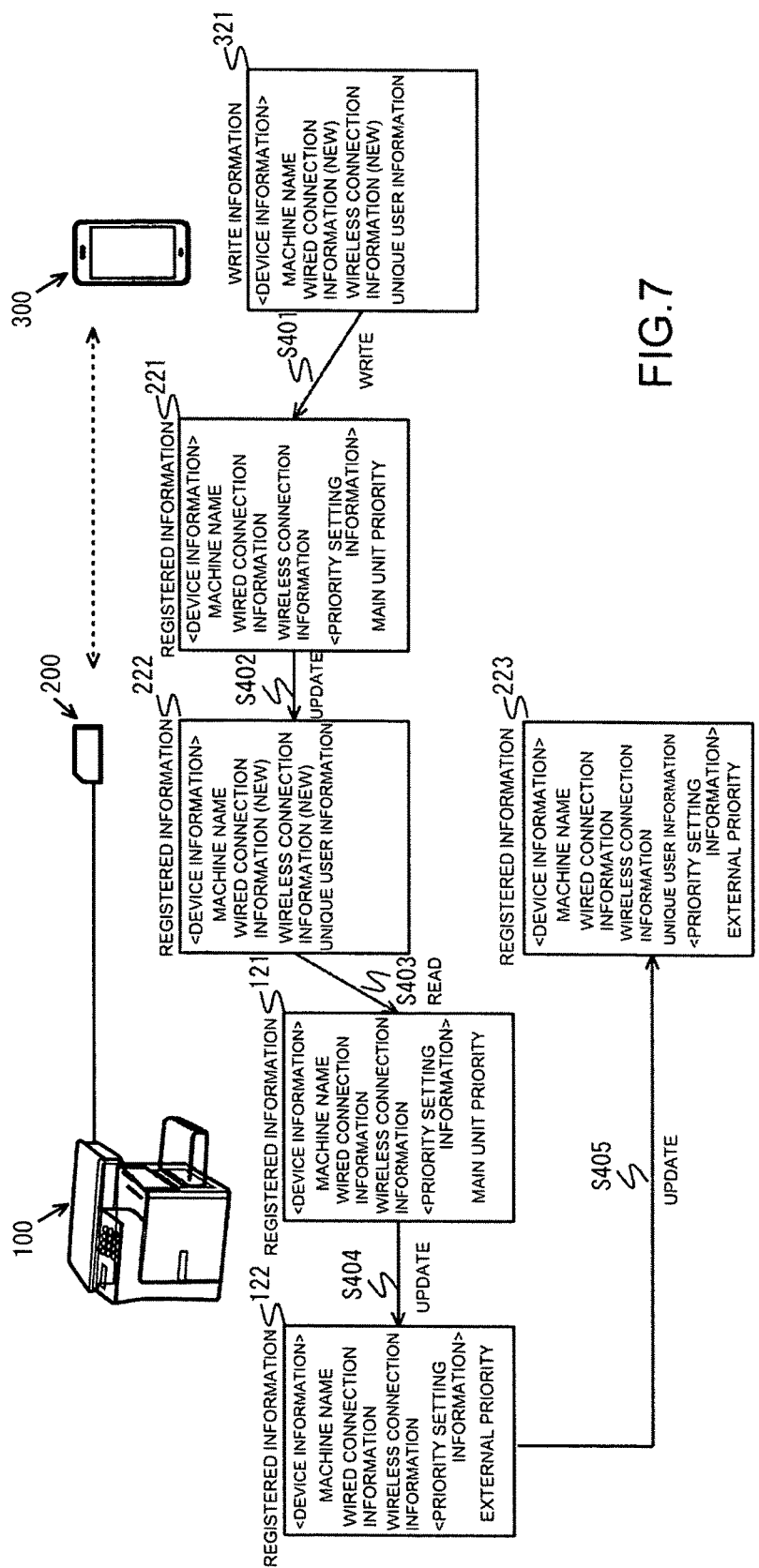

ELECTRONIC DEVICE SUITABLE FOR WRITING INFORMATION TO WIRELESS TAGS AND INFORMATION UPDATE METHOD

INCORPORATION BY REFERENCE

This application is based on and claims the benefit of priority from Japanese Patent Application No. 2016-096930 filed on May 13, 2016, the contents of which are hereby incorporated by reference.

BACKGROUND

The present disclosure relates to an electronic device that is suitable for writing information to a wireless tag such as a NFC (Near Field Communications) tag, and to an information update method.

For example, in a MFP (Multifunction Peripheral) image-forming device such as a printer, multifunction printer, multifunction device and the like, a wireless tag such as a NFC tag may be mounted on which wired or wireless connection information that is necessary for network connection, or device information such as a device name and the like are stored.

A wireless tag is such that by being managed by an image-forming device, the connection information or device information of the wireless tag is rewritten by the image-forming device. Particularly, when an update setting for a wireless tag on the image-forming device side is set to automatic, the image-forming device will perform automatic update of the connection information on the wireless tag when updating the connection information. Moreover, with a wireless tag reader/writer that is mounted on a portable terminal, it is possible to read connection information and machine information on a wireless tag, and to write unique user information for starting various application programs that are installed in the portable terminal to a wireless tag.

In typical technology, this kind of wireless tag may be used in a printing system that performs a printing process in which an IC tag that stores information related to the output destination is mounted on a printer, and the information related to the output destination stored on the IC tag is read by a portable terminal having an IC card reader, and when a client PC (Personal Computer) is notified of the information related to the output destination, printing settings and the like, the client PC transmits spooled job information to the printer of the output destination.

SUMMARY

The electronic device of the present disclosure includes a storage device that stores first registered information; a wireless tag that stores second registered information; and a system-control unit that updates contents of the second registered information based on the first registered information; wherein the system-control unit updates contents of information other than information that allows writing when there is writing to the wireless tag from the outside.

The non-transitory computer readable recording medium of the present disclosure stores an information update program that can be executed by a computer that controls the electronic device. The information update program causes the computer to: store first registered information in a storage device; store second registered information in a wireless tag; update contents of the second registered information based on the first registered information; and update contents of information other than information that allows writing when there is writing to the wireless tag from the outside.

BRIEF DESCRIPTION OF THE DRAWINGS

FIG. 3A illustrates a management table for managing information when the MFP side is set to main unit priority.

FIG. 7 illustrates an example of writing information to an NFC tag from a portable terminal when there is unique user information but no priority setting information in the information written from the portable terminal in FIG. 1.

DETAILED DESCRIPTION

In the following, an embodiment of the electronic device of the present disclosure will be explained with reference to FIG. 1 to FIG. 7. In the following explanation, as the electronic device, there is for example, a MFP (Multifunction Peripheral) that is a combined peripheral device that is equipped with a printing function, a copy function, a FAX function, a data transmitting/receiving function via a network and the like.

Figure 1:
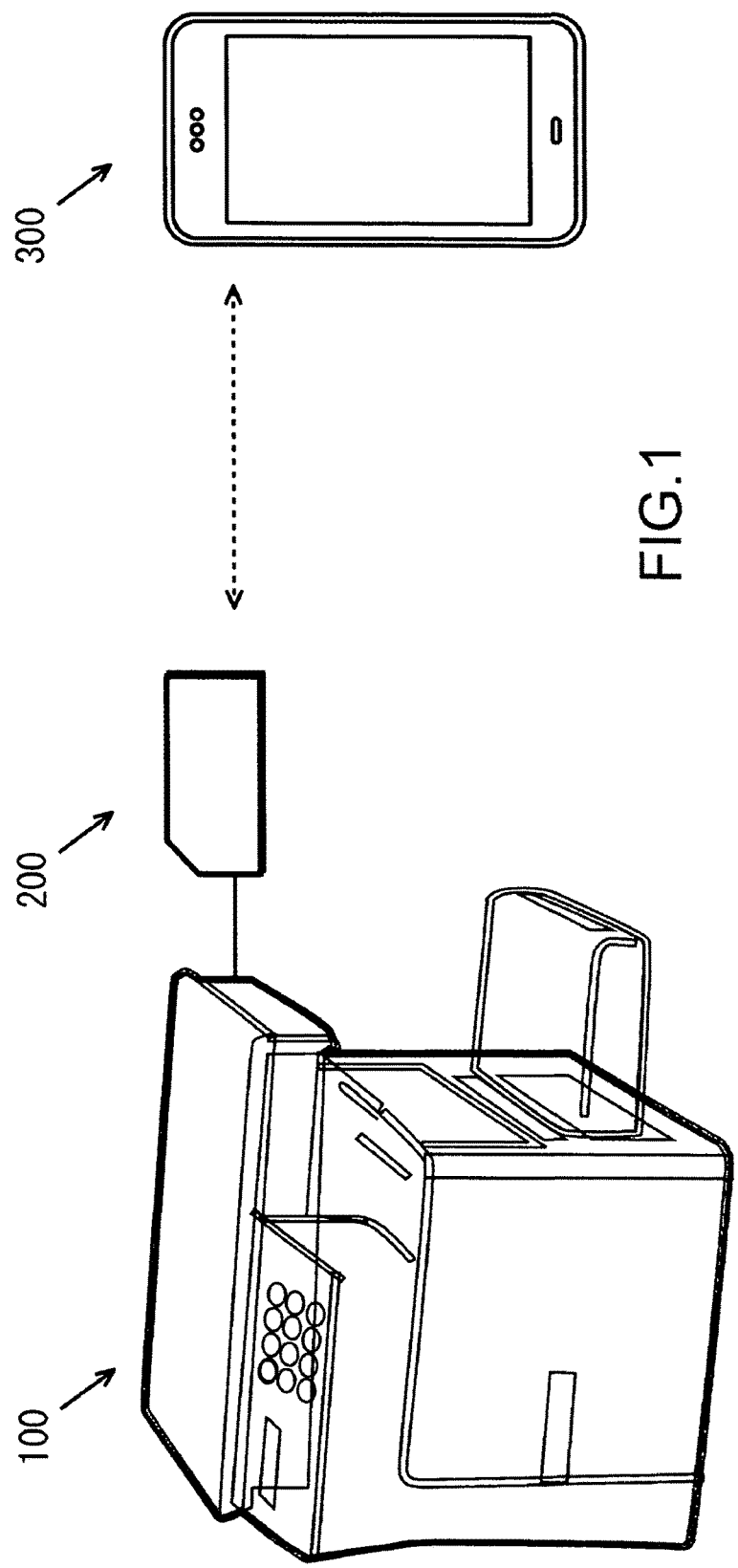
FIG. 1 illustrates an embodiment when the electronic device of the present disclosure is applied to a MFP.

First, as illustrated in FIG. 1, the MFP 100 has a NFC (Near Field Communications) tag 200. In FIG. 1, reference number 300 indicates a portable terminal. Here, the NFC tag 200 is connected to the MFP 100 by a wired connection (serial bus such as a I2C bus). The NFC tag 200 is also wirelessly connected to the portable terminal 300.

Moreover, it will be described in detail later, however, information that is stored on the NFC tag 200 can be rewritten by the MFP 100 and the portable terminal 300. Furthermore, it is also possible for the portable terminal 300 to write unique user information for starting various application programs that are installed in the portable terminal 300, for example, to the NFC tag 200.

Figure 2:
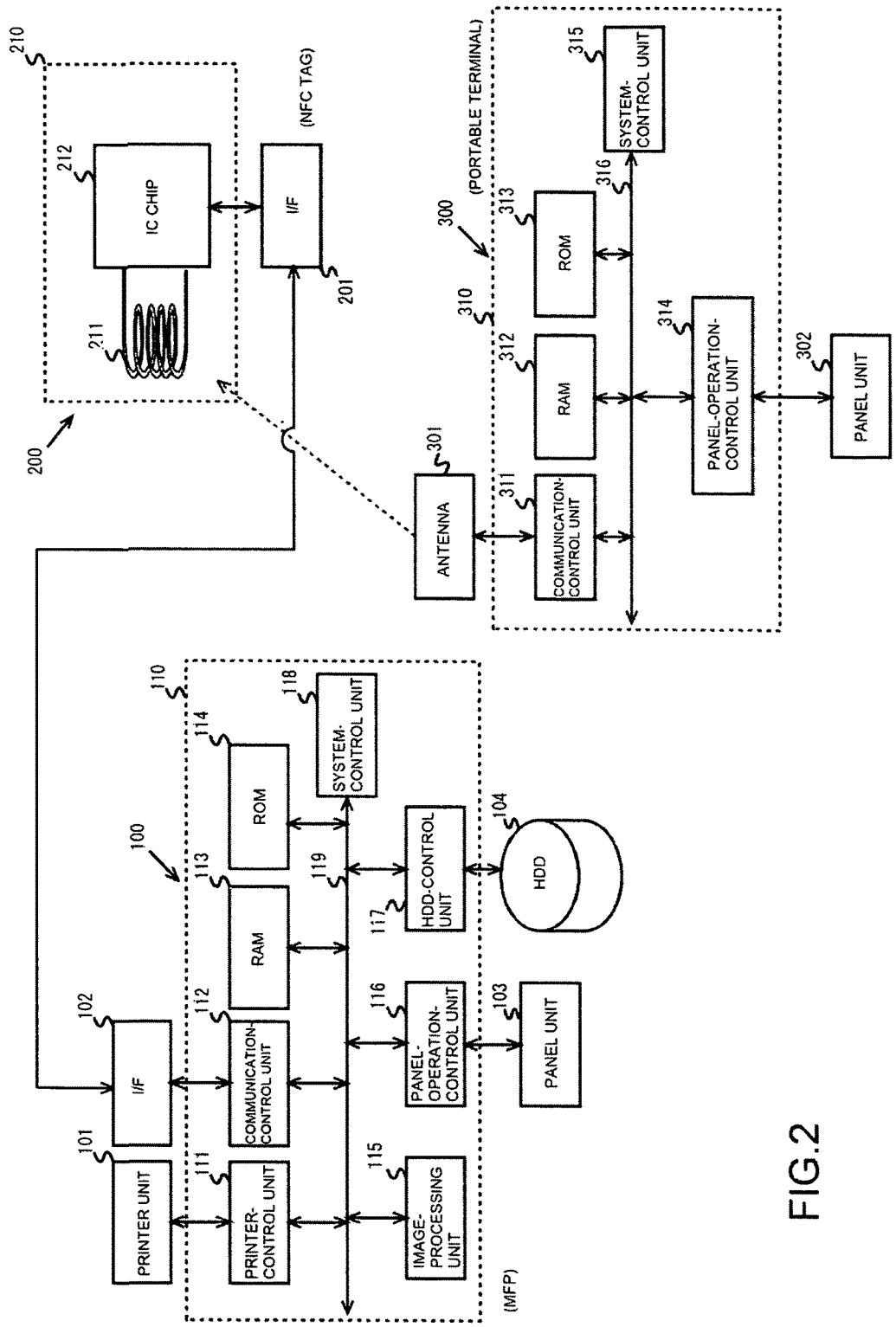
FIG. 2 illustrates an example of the configuration of the MFP, NFC tag and portable terminal in FIG. 1.

Next, an example of the configuration of the MFP 100, the NFC tag 200 and the portable terminal 300 will be explained with reference to FIG. 2. First, the MFP 100 includes a control unit 110 that controls a printer unit 101, an I/F (interface) 102, a panel unit 103, and an HDD 104. The MFP 100 may also include a scanner unit, a FAX unit and the like.

The printer unit 101 is a device that prints images on paper based on printing data that is outputted from the control unit 110. The I/F 102 takes charge of communication with the NFC tag 200. The I/F 102 takes charge of communication with the portable terminal 300 by way of a network such as a LAN (Local Area Network). Moreover, the I/F 102 may also take over communication with a contents server, web server and the like. The panel unit 103 is a device such as a touch panel that performs a display for the printing function, copy function, FAX function, data transmitting/receiving function via a network, and for various settings of the MFP 100. The HDD 104 is a storage device that stores application programs and the like for providing the various functions of the MFP 100. The HDD 104 has, for example, a user box for storing a registered printing job from a user terminal. Moreover, the HDD 104, as will be described in detail later, registers registered information 121 that will be described later.

The control unit 110 is a processor that executes an image-forming program, control program and the like, and controls the overall operation of the MFP 100. The control unit 110 includes a printer-control unit 111, a communication-control unit 112, RAM 113, ROM 114, an image-processing unit 115, a panel-operation-control unit 116, a HDD-control unit 117, and a system-control unit 118. Moreover, these are connected to a data bus 119.

The printer-control unit 111 controls the printing operation of the printer unit 101. The communication-control unit 112 performs control of transmitting and receiving information to and from a NFC tag 200 via the I/F 102. The RAM 113 is a work memory for executing programs. The ROM 114 stores a control program for performing operation checks of all of the units. The image-processing unit 115 performs image processing (rasterizing) of registered printing jobs in the user box of the HDD 104, for example. The system-control unit 118 temporarily stores printing data that has undergone image processing by the image-processing unit 115 in the RAM 113.

The panel-operation-control unit 116 controls the display operation of the panel unit 103. Moreover, the panel-operation-control unit 116, by way of the panel unit 103, receives start settings and the like for printing, copying, a FAX, transmitting or receiving data via a network. The HDD-control unit 117 controls reading and writing of data to and from the HDD 104.

The system-control unit 118 controls the cooperative operation of all each of the units. Moreover, the system-control unit 118, as will be described in detail later, updates automatically, for example, the contents of registered information 121 (described later) that is registered in the HDD 104, and registered information 221 that is stored in a NFC tag 200. Moreover, when the MFP 100 is started, or for example, when the portable terminal 300 writes to the NFC 200, the system-control unit 118 updates the contents of the registered information 221 of the NFC tag 200 based on the contents of registered information 121 (described later) that is registered in the HDD 104 for information other than information for allowing writing of unique user information.

The NFC tag 200 includes a control unit 210 that controls an I/F 201. The I/F 201 takes charge of communication with the MFP 100. The control unit 210 has an antenna unit 211 and an IC chip 212. The antenna unit 211 performs communication with the portable terminal 300 by using a specific frequency (for example, 13.56 MHz). The IC chip 212 has a nonvolatile memory that stores registered information 221 that will be described later. Moreover, the IC chip 212 writes information that is received by way of the I/F 201 or antenna unit 211 in the nonvolatile memory, and transmits information in the nonvolatile memory by way of the I/F 201 or the antenna unit 211. The information in the nonvolatile memory is written in a format that is defined by the NFC standard.

The portable terminal 300 includes a control unit 310 that controls an antenna 301, and a panel unit 302. The antenna 301 takes charge of wireless communication with the NFC tag 200. The antenna 301, by way of a network, takes charge of communication with the MFP 100, a content server, a web server and the like. The panel unit 302 is a device such as a touch panel for performing selection of various functions of the portable terminal 300, inputting text, displaying information and the like.

The control unit 310 is a processor that executes application programs and control programs, and controls the overall operation of the portable terminal 300. The control unit 310 includes a communication-control unit 311, a RAM 312, a ROM 313, a panel-operation-control unit 314, and a system-control unit 315. Moreover, these are connected to a data bus 316.

The communication-control unit 311 performs control of receiving and transmitting information to and from the NFC tag 200, MFP 100 and the like by way of the antenna 301. The RAM 312 is a work memory for executing programs. The ROM 313 stores a control program for performing operation checks of each of the units. The panel-operation-control unit 314 controls the display operation of the panel unit 302.

The system-control unit 315 controls cooperative operation of each of the units. Moreover, the system-control unit 315 has a wireless tag reader/writer function, and when there is an instruction by way of the panel unit to read or write information to or from the NFC tag 200, transmits radio waves from the antenna 301 to the communication-control unit 311.

Figure 3B:
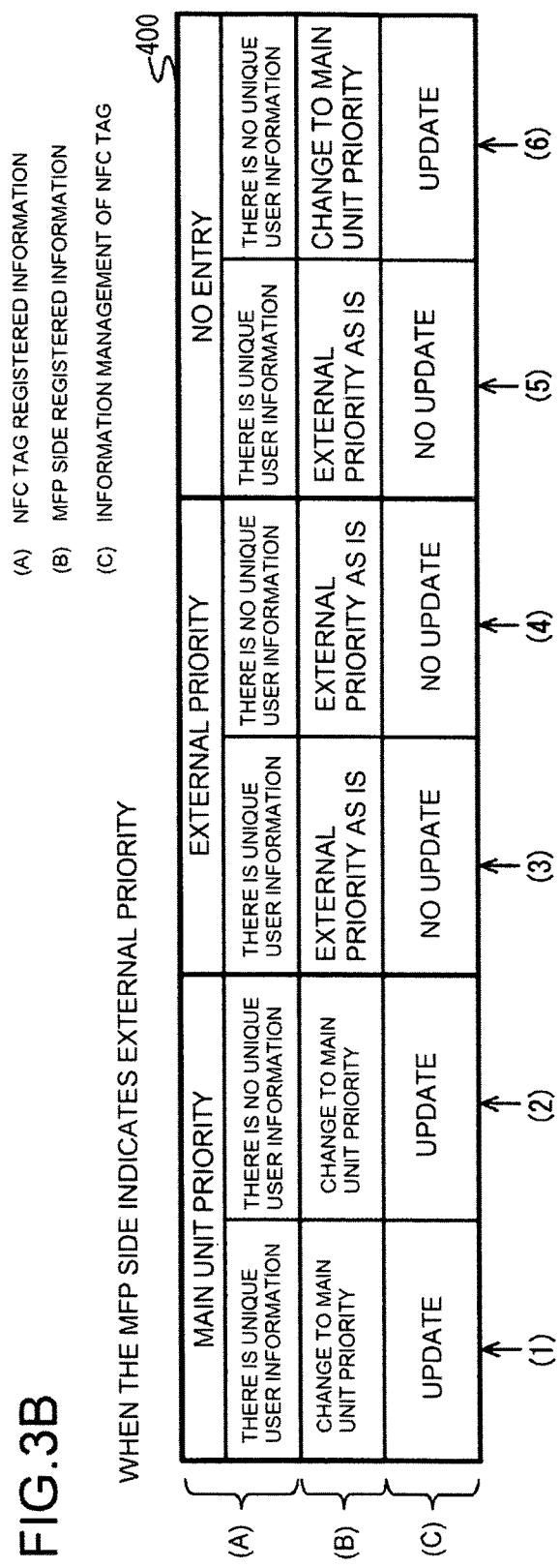
FIG. 3B illustrates a management table for managing information when the MFP side is set to external priority.

Next, information management by the MFP 100 will be explained with reference to FIG. 3A and FIG. 3B. FIG. 3A is an information management table in the case when the MFP 100 side is set to main unit priority, and FIG. 3B is an information management table in the case when the MFP 100 side is set to external priority. Here, main unit priority means that it is possible for the MFP 100 side to preferentially update information of the NFC tag 200. Moreover, external priority means that the it is possible for the portable terminal 300 side to preferentially update information of the NFC tag 200, temporarily.

Moreover, at start up, the MFP 100 reads registered information 221, 222 or 223 that will be described later of the NFC tag 200, and checks the priority setting information. Furthermore, at startup the MFP 100 reads registered information 121 or 122 that will be described later that is registered in the HDD 104, and checks the priority setting information. Then, the MFP 100 manages information of the NFC tag 200 according to the contents of the management table 400. In the following, for convenience of explanation, it is presumed that at start up, the MFP 100 reads the registered information 221 that will be described later of the NFC tag 200, and reads the registered information 121 that will be described later that is registered in the HDD 104.

First, the management table 400 illustrated in FIG. 3A lists the registered information 221 of the NFC tag 200 that is indicated by (A), the registered information 121 on the MFP 100 side that is indicated by (B), and the information management for the NFC tag 200 that is indicated by (C). Moreover, priority setting information and device information are included in the registered information 221 of the NFC tag 200 indicated by (A). The priority setting information indicates whether the priority is main unit priority, external priority, or no entry. The device information includes at least one of the machine name, wired connection information, wireless connection information, and unique user information.

Here, as illustrated in vertical column (1), when the priority setting information of the registered information 221 of the NFC tag 200 indicates main unit priority and there is unique user information in the device information, the MFP 100 keeps the priority setting information of the registered information 121 as is as main unit priority. Furthermore, the MFP 100 updates the device information of the NFC tag 200 after the device information of the NFC tag 200 has been updated by the portable terminal 300. In other words, the device information of the NFC tag 200 that is updated by the portable terminal 300 is updated by the device information that is registered in the HDD 104. As a result, the device information that is written in the NFC tag 200 before update by the portable terminal 300 is maintained. Moreover, as illustrated in vertical column (2), when the priority setting information of the registered information 221 of the NFC tag 200 indicates main unit priority and there is no unique user information in the device information, the MFP 100 keeps the priority setting information of the registered information 121 as is as main unit priority. Furthermore, the MFP 100 updates the device information of the NFC tag 200 after the device information of the NFC tag 200 is updated by the portable terminal 300. In other words, the device information of the NFC tag 200 that is updated by the portable terminal 300 is updated by the device information that is registered in the HDD 104. As a result, the device information that is written in the NFC tag 200 before update by the portable terminal 300 is maintained.

Moreover, as illustrated in vertical column (3), when the priority setting information of the registered information 221 of the NFC tag 200 indicates external priority and there is unique user information in the device information, the MFP 100 updates the priority setting information of the registered information 121 to external priority. Even when the device information of the NFC tag 200 is updated by the portable terminal 300, the MFP 100 does not update the device information of the NFC tag 200. As a result, the device information that is written in the NFC tag 200 before update by the portable terminal 300 is replaced with the device information written by the portable terminal 300. Moreover, as illustrated in vertical column (4), when the priority setting information of the registered information 221 of the NFC tag 200 indicates external priority and there is no unique user information in the device information, the MFP 100 updates the priority setting information of the registered information 121 to external priority. Even when the device information of the NFC tag 200 is updated by the portable terminal 300, the MFP 100 does not update the device information of the NFC tag 200. As a result, device information that is written in the NFC tag 200 before update by the portable terminal 300 is replaced by the device information that is written by the portable terminal 300.

Moreover, as illustrated in vertical column (5), when the priority setting information of the registered information 221 of the NFC tag 200 is no entry and there is unique user information in the device information, the MFP 100 changes the priority setting information of the registered information 121 to external priority. Even when the device information of the NFC tag 200 is updated by the portable terminal 300, the MFP 100 does not update the device information of the NFC tag 200. As a result, device information that is written in the NFC tag 200 before update by the portable terminal 300 is replaced by the device information that is written by the portable terminal 300. Furthermore, as illustrated in vertical column (6), when the priority setting information of the registered information 221 of the NFC tag 200 is no entry and there is no unique user information in the device information, the MFP 100 keeps the priority setting information of the registered information 121 as is as main unit priority. Furthermore, after the device information of the NFC tag 200 is updated by the portable terminal 300, the MFP 100 updates the device information of the NFC tag 200. In other words, the device information of the NFC tag 200 that is updated by the personal terminal 300 is updated with device information that is registered in the HDD 104. As a result, the device information that is written in the NFC tag 200 before update by the portable terminal 300 is maintained.

As described above, columns (1), (2) and (6) illustrated in FIG. 3A indicate that update of device information of the NFC tag 200 returns to the original device information after the device information has been temporarily updated.

Next, the management table 400 illustrated in FIG. 3B will be explained. First, as illustrated in vertical column (1), when the priority setting information of the registered information 221 of the NFC tag 200 indicates main unit priority and there is unique user information in the device information, the MFP 100 updates the priority setting information of the registered information 121 to main unit priority. Furthermore, after the device information of the NFC tag 200 is updated by the portable terminal 300, the MFP 100 updates the device information of the NFC tag 200. In other words, the device information of the NFC tag 200 that is updated by the portable terminal 300 is updated with device information that is registered in the HDD 104. As a result, the device information that is written in the NFC tag 200 before update by the portable terminal 300 is maintained. Moreover, as illustrated in vertical column (2), when the priority setting information of the registered information 221 of the NFC tag 200 indicates main unit priority and there is no unique user information in the device information, the MFP 100 updates the priority setting information of the registered information 121 to main unit priority. Furthermore, after the device information of the NFC tag 200 is updated by the portable terminal 300, the MFP 100 updates the device information of the NFC tag 200. In other words, the device information of the NFC tag 200 that is updated by the portable terminal 300 is updated with device information that is registered in the HDD 104. As a result, the device information that is written in the NFC tag 200 before update by the portable terminal 300 is maintained.

Moreover, as illustrated in vertical column (3), when the priority setting information of the registered information 221 of the NFC tag 200 indicates external priority and there is unique user information in the device information, the MFP 100 keeps the priority setting information of the registered information 121 as is as external priority. Even when the device information of the NFC tag 200 is updated by the portable terminal 300, the MFP 100 does not update the device information of the NFC tag 200. As a result, the device information that is written in the NFC tag 200 before update by the portable terminal 300 is replaced with device information that is written by the portable terminal 300. Moreover, as illustrated in vertical column (4), when the priority setting information of the registered information 221 of the NFC tag 200 indicates external priority and there is no unique user information in the device information, the MFP 100 keeps the priority setting information of the registered information 121 as is as external priority. Even when the device information of the NFC tag 200 is updated by the portable terminal 300, the MFP 100 does not update the device information of the NFC tag 200. As a result, device information that is written in the NFC tag 200 before update by the portable terminal 300 is replaced with device information that is written by the portable terminal 300.

Moreover, as illustrated in vertical column (5), when the priority setting information of the registered information 221 of the NFC tag 200 is no entry and there is unique user information in the device information, the MFP 100 keeps the priority setting information of the registered information 121 as is as external priority. Even when the device information of the NFC tag 200 is updated by the portable terminal 300, the MFP 100 does not update the device information of the NFC tag 200. As a result, the device information that is written in the NFC tag 200 before update by the portable terminal 300 is replaced with the device information that is written by the portable terminal 300. Moreover, as illustrated in vertical column (6), when the priority setting information of the registered information 221 of the NFC tag 200 is no entry and there is no unique user information in the device information, the MFP 100 updates the priority setting information of the registered information 121 to main unit priority. Furthermore, after the device information of the NFC tag 200 is updated by the portable terminal 300, the MFP 100 updates the device information of the NFC tag 200. In other words, the device information of the NFC tag 200 that is updated by the portable terminal 300 is updated with device information that is registered in the HDD 104. As a result, the device information that is written in the NFC tag 200 before update by the portable terminal 300 is maintained.

As described above, columns (1), (2) and (6) illustrated in FIG. 3B indicate that update of device information of the NFC tag 200 returns to the original device information after the device information has been temporarily updated.

Figure 4:
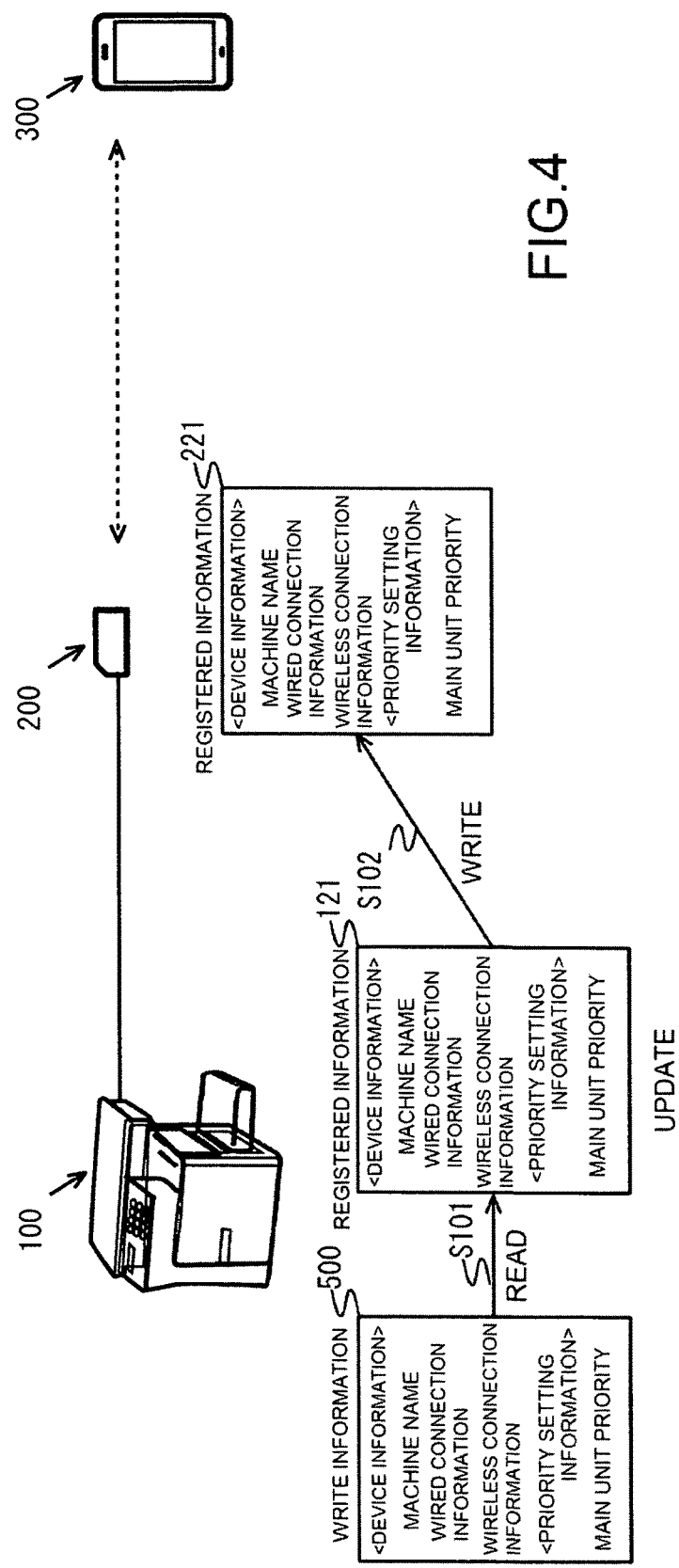
FIG. 4 illustrates an example of writing information to an NFC tag from the MFP in FIG. 1.
Figure 5:
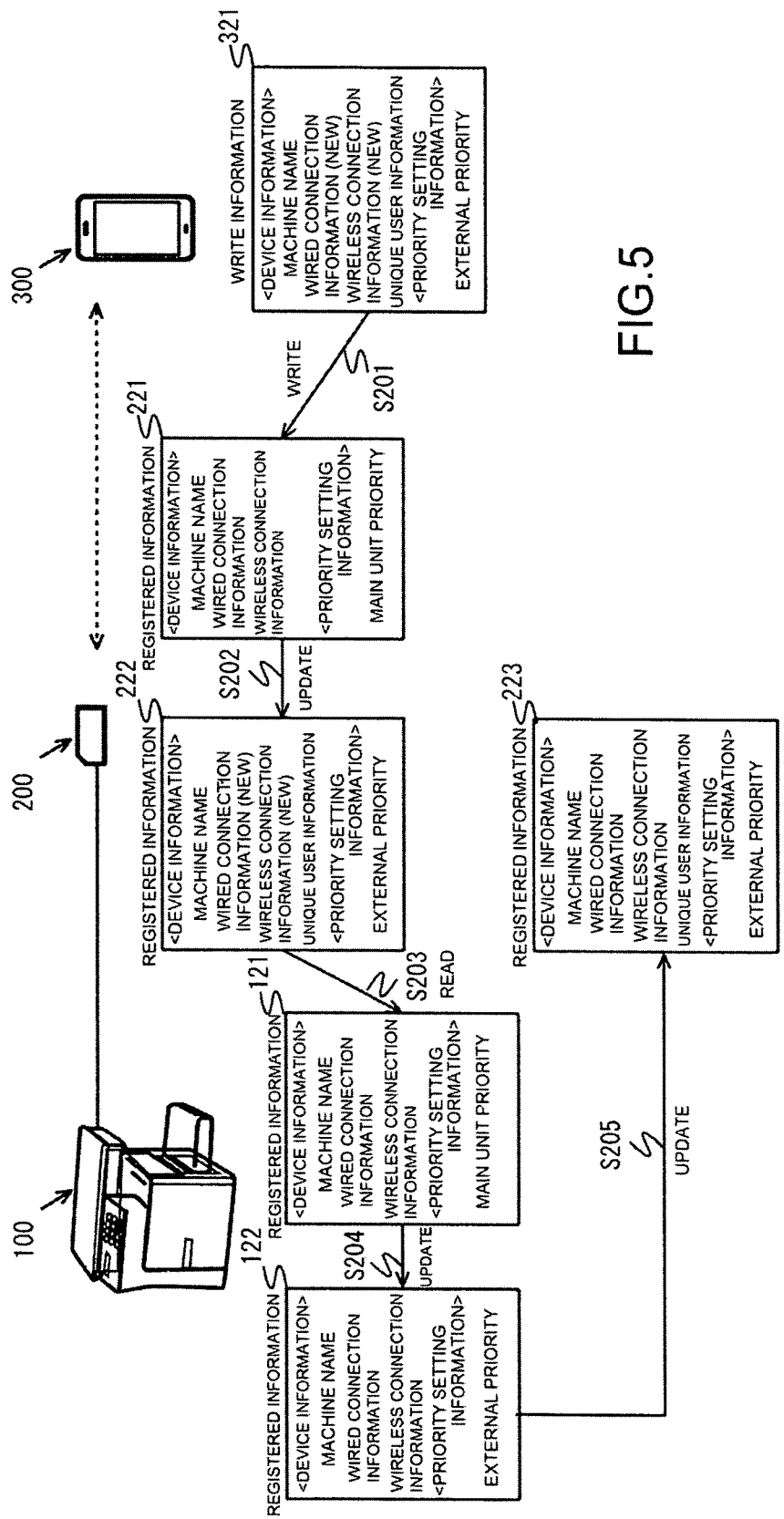
FIG. 5 illustrates an example of writing information to an NFC tag from the portable terminal in FIG. 1.
Figure 6:
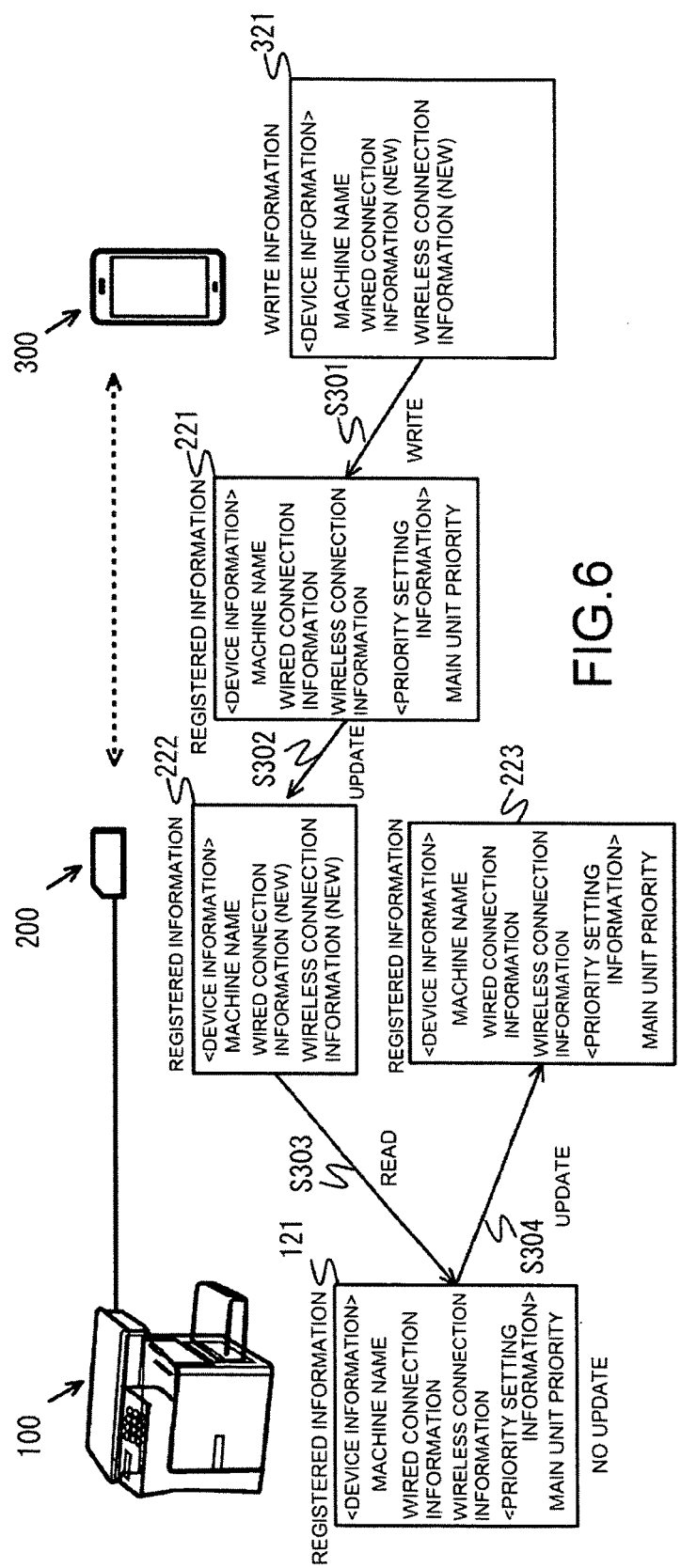
FIG. 6 illustrates an example of writing information to an NFC tag from a portable terminal when there is no unique user information and there is no priority setting information in the information written from the portable terminal in FIG. 1.

Next, the method for updating information of the NFC tag 200 will be explained with reference to FIG. 4 to FIG. 7. FIG. 4 illustrates the case in which information is written to the NFC tag 200 from the MFP 100. FIG. 5 to FIG. 7 illustrate the case in which information is written to the NFC tag 200 from the portable terminal 300 after information is written to the NFC tag 200 from the MFP 100 as illustrated in FIG. 4.

First, writing information to the NFC tag 200 from the MFP 100 will be explained with reference to FIG. 4.

(Step S101)
Write information 500 is read. In other words, the system-control unit 118 of the MFP 100, by way of the communication-control unit 112, for example, reads write information 500 that is obtained via a network.

Here, the write information 500 includes device information that indicates the machine name, wired connection information and wireless connection information, and priority setting information that indicates main unit priority. Then, the system-control unit 118 of the MFP 100 registers contents that are the same as the write information 500 that is read to the HDD 104 as registered information 121.

(Step S102)
The registered information 121 is written. In other words, the system-control unit 118 of the MFP 100, by way of the communication-control unit 112, transmits the registered information 121 to the NFC tag 200. Then, the IC chip 212 of the NFC tag 200 writes registered information 221 having contents that are the same as the registered information 121 to the nonvolatile memory.

In other words, in this case, the initial state in which the NFC tag 200 does not store information is presumed.

When the NFC tag 200 stores information, the system-control unit 118 updates the registered information of the NFC tag 200 with registered information 121.

Next, writing write information 321 to the NFC tag 200 by the portable terminal 300 will be explained with reference to FIG. 5.

(Step S201)
The write information 321 is transmitted to the NFC tag 200 from the portable terminal 300. In other words, the write information 321 includes device information that indicates the machine name, wired connection information (new), wireless connection information (new) and unique user information, and priority setting information that indicates external priority. The wired connection information (new) and the wireless connection information (new) are connection information that are set on the portable terminal side 300.

(Step S202)
The NFC tag 200 updates the registered information 221. In other words, the IC chip 212 of the NFC tag 200 receives write information 321 by way of the antenna unit 211, and then updates the contents of the current registered information 221 based on the contents of the write information 321.

In this case, the IC chip 212 updates the device information to the machine name, wired connection information (new), wireless connection information (new) and unique user information as indicated in the registered information 222, and updates the priority setting information from main unit priority to external priority.

(Step S203)
The MFP 100 reads the registered information 222 of the NFC tag 200. In other words, the system-control unit 118 of the MFP 100, by way of the communication-control unit 112, reads the registered information 222 of the NFC tag 200.

(Step S204)
The MFP 100 updates the registered information 121. In other words, the system-control unit 118 of the MFP 100 updates the current registered information 121 that is registered in the HDD 104 based on the contents of the registered information 222, and designates it as registered information 122. In this case, the system-control unit 118, as indicated in the registered information 122, does not update the device information, but only updates the priority setting information from main unit priority to external priority.

(Step S205)
The MFP 100 updates the registered information 222 of the NFC tag 200. In this case, the system-control unit 118 of the MFP 100, by way of the communication-control unit 112, transmits the registered information 122 to the NFC tag 200. Then, the IC chip 212 of the NFC tag 200 writes registered information 223 having the same contents as registered information 122 in the nonvolatile memory.

As a result, of the registered information 223 of the NFC tag 200, the unique user information of the device information, and external priority as the priority setting information are not updated, however, the wired connection information (new) and the wireless connection information (new) are updated to the wired connection information and the wireless connection information of the MFP 100 side.

In this case, it is presumed that it is possible for the portable terminal 300 to write unique user information to the NFC tag 200, however, changing the wired connection information and wireless connection information is not possible.

Next, the case of writing information to the NFC tag 200 from the portable terminal 300 when there is no unique user information in the device information of the write information 321 from the portable terminal 300 and there is also no priority setting information will be explained with reference to FIG. 6.

(Step S301)
Write information 321 is transmitted to the NFC tag 200 from the portable terminal 300. In other words, the write information 321 only has device information that indicates the machine name, wired connection information (new) and wireless connection information (new), and does not have unique user information and priority setting information. Moreover, in the device information of the write information 321, both the wired connection information and the wireless connection information have new contents that are the wired connection information (new) and wireless connection information (new). In other words, in this case it is presumed that the wired connection information and the wireless connection information of the NFC tag 200 are rewritten from the portable terminal 300.

(Step S302)

The NFC tag 200 updates the registered information 221. In other words, the IC chip 212 of the NFC tag 200 receives write information 321 by way of the antenna 211, and updates the contents of the current registered information 221 based on the contents of the write information 321. In this case, the IC chip 212 updates the wired connection information and the wireless connection information of the device information with the wired connection information (new) and the wireless connection information (new), and deletes the priority setting information as indicated in the registered information 222.

(Step S303)

The MFP 100 reads the registered information 222 of the NFC tag 200. In other words, the system-control unit 118 of the MFP 100, by way of the communication-control unit 112, reads the registered information 222 of the NFC tag 200.

(Step S304)

The MFP 100 updates the registered information 222 of the NFC tag 200. In this case, the system-control unit 118 of the MFP 100 writes the contents of the current registered information 121 to the NFC tag 200 without updating the contents of the current registered information 121 that is registered in the HDD 104. In other words, there is no unique user information in the device information of the registered information 222 of the NFC tag 200, so the system-control unit 118 of the MFP 100 does not update the current registered information 121. Moreover, the system-control unit 118 of the MFP 100, by way of the communication-control unit 112, rewrites registered information 222 of the NFC tag 200 to the contents of the current registered information 121 as indicated in the registered information 223.

In this case, the device information of the registered information 222 of the NFC tag 200 is temporarily rewritten, however, is immediately rewritten to the contents of the current registered information 121 by the system-control unit 118 of the MFP 100. As a result, it is possible to prevent the wired connection information and the wireless connection information of the device information of the registered information 221 of the NFC tag 200 from being rewritten by the portable terminal 300.

Next, writing information to the NFC tag 200 from the portable terminal 300 in the case in which there is unique user information but no priority setting information in the device information of the write information 321 from the portable terminal 300 will be explained with reference to FIG. 7.

(Step S401)

Write information 321 is transmitted to the NFC tag 200 from the portable terminal 300. In other words, the write information 321 only has device information that indicates the machine name, wired connection information (new), wireless connection information (new), and unique user information, and does not have priority setting information.

(Step S402)

The NFC tag 200 updates the registered information 221. In other words, the IC chip 212 of the NFC tag 200 receives write information 321 by way of the antenna unit 211, and then updates the contents of the current registered information 221 based on the contents of the write information 321. In this case, the IC chip 212 changes the wired connection information and the wireless connection information of the device information to the wired connection information (new) and the wireless connection information (new) and further adds unique user information as indicated in the registered information 222.

(Step S403)

The MFP 100 reads the registered information 222 of the NFC tag 200. In other words, the system-control unit 118 of the MFP 100, by way of the communication-control unit 112, reads the registered information 222 of the NFC tag 200.

(Step S404)

The MFP 100 updates the registered information 121. In other words, there is unique user information in the device information of the registered information 222 of the read NFC tag 200, so the system-control unit 118 of the MFP 100 updates the contents of the current registered information 121 based on the contents of the registered information 222. In this case, the system-control unit 118 changes the priority setting information from main unit priority to external priority as indicated in the registered information 122.

(Step S405)

The MFP 100 updates the registered information 222 of the NFC tag 200. In this case, the system-control unit 118 of the MFP 100 writes the contents of the current registered information 122 to the NFC tag 200. In other words, the system-control unit 118 of the MFP 100, by way of the communication-control unit 112, rewrites the registered information 222 of the NFC tag 200 to the contents of current registered information 122 as indicated in the registered information 223.

In this case, the device information of the registered information 222 of the NFC tag 200 is temporarily rewritten, however, is immediately rewritten to the contents of the current registered information 122 by the system-control unit 118 of the MFP 100. As a result, it is possible to prevent the wired connection information and the wireless connection information of the device information of the registered information 221 of the NFC tag 200 from being rewritten by the portable terminal 300.

In this way, in this embodiment, together with registered information 121 or 122 (first registered information) being stored in the HDD 104 (storage device) and registered information 221, 222 or 223 (second registered information) being stored in a NFC tag 200 (wireless tag) by the system-control unit 118, the contents of the registered information 221 or 222 (second registered information) are updated based on the registered information 121 or 122 (first registered information). When there is writing to the NFC tag 200 (wireless tag) from the portable terminal 300, contents of information other than information that allows writing (for example, unique user information) is updated.

As a result, even when the update setting for the NFC tag 200 (wireless tag) is set to automatic, it is possible to write information that allows writing (for example, unique user information) to the NFC tag 200 (wireless tag) from the portable terminal 300 without temporarily stopping the automatic update, so it is possible to increase the operability of writing information that allows writing (for example, unique user information) to the NFC tag 200 (wireless tag) from the outside.

In the electronic device and information update method of the present disclosure, together with the system-control unit storing the first registered information in the storage device and storing the second registered information in the wireless tag, the system control unit updates the contents of the second registered information based on the first registered information. When there is writing to the wireless tag from the outside, contents of information other than information that allows writing is updated.

As a result, even when the update setting for the wireless tag is set to automatic, it is possible to write information that allows writing (for example unique user information) to the wireless tag from the outside without temporarily stopping that automatic update.

In a printing system using typical technology described above, by notifying a client PC that spools job information of information related to the output destination and printing settings that are read by a portable terminal from an IC tag that is mounted to a printer, a printing process is executed by the printer, so it becomes easy to give printing instructions to the printer.

Incidentally, in addition to device information that is information about the output destination, information necessary for a network connection such as wired or wireless connection information may be stored on the IC tag that is mounted to the printer. Moreover, the printer is able to update device information and connection information that are stored on the IC tag to information according to change contents. Particularly, when the update setting for the IC tag is set to automatic on the printer side, the printer automatically updates the connection information and the like of the IC tag. Moreover, by using an IC card reader from the portable terminal side as well, it is possible to read device information and connection information that are stored on the IC tag, and write unique user information as described above to the IC tag.

Incidentally, when writing unique user information to the IC tag from the portable terminal side, when the update setting for the IC tag is set to automatic on the printer side, it is not possible to write unique user information to the IC tag from the portable terminal side directly. In this case, there is a problem in that a procedure for temporarily stopping automatic update on the printer side and writing the unique user information to the IC tag from the portable terminal side is necessary, and this operation is troublesome.

Taking into consideration the situation described above, the object of the present disclosure is to provide an electronic device and information update method that can eliminate the problems described above.

With the electronic device and information update method of the present disclosure, it is possible to write information that allows writing to the wireless tag from the outside (for example, unique user information) without having to temporarily stop automatic update, so it is possible to increase the operability of writing information that allows writing to the wireless tag from the outside (for example, unique user information).

In this embodiment, the case in which the electronic device of the present disclosure was applied to a MFP 100 was explained, however, the device is not limited to a MFP 100 and the electronic device can be also applied to a information devices such as PC (Personal Computer, or household appliances and the like.

What is claimed is:

1. An electronic device, comprising:
a storage device that stores first registered information; a wireless tag that stores second registered information; and
a system-control unit that updates contents of the second registered information based on the first registered information; wherein
the system-control unit updates contents of information other than information that allows writing when there is writing to the wireless tag from the outside;
the first registered information has device information that includes connection information, and priority setting information that indicates main unit priority or external priority; and
the system-control unit updates device information of the second registered information to correspond to update of the device information of the first registered information when priority setting information of the second registered information indicates main unit priority.

2. The electronic device according to claim 1, wherein the system-control unit updates the priority setting information of the first registered information to external priority when the priority setting information of the second registered information indicates external priority.

3. The electronic device according to claim 2, wherein the system-control unit updates the contents of second registered information other than information that allows writing based on the first registered information when the priority setting information of the second registered information is not entered and the priority setting information of the first registered information indicates main unit priority.

4. The electronic device according to claim 1, wherein the system-control unit updates the priority setting information of the first registered information to external priority, and updates the contents of second registered information other than information that allows writing when the priority setting information of the second registered information is not entered, there is information that allows writing to the device information of the second registered information and the priority setting information of the first registered information indicates main unit priority.

5. A non-transitory computer readable recording medium that stores an information update program that can be executed by a computer that controls an electronic device, wherein
the information update program causes the computer to:
store first registered information in a storage device; store second registered information in a wireless tag;
update contents of the second registered information based on the first registered information; and
update contents of information other than information that allows writing when there is writing to the wireless tag from the outside;
the first registered information has device information that includes connection information, and priority setting information that indicates main unit priority or external priority; and
the information update program further causes the computer to
update device information of the second registered information to correspond to update of the device information of the first registered information when priority setting information of the second registered information indicates main unit priority.

6. The non-transitory computer readable recording medium according to claim 5, wherein
the information update program further causes the computer to
update the priority setting information of the first registered information to external priority when the priority setting information of the second registered information indicates external priority.

7. A non-transitory computer readable recording medium that stores an information update program that can be executed by a computer that controls an electronic device, wherein
the information update program causes the computer to:
store first registered information in a storage device; store second registered information in a wireless tag;
update contents of the second registered information based on the first registered information;
update contents of information other than information that allows writing when there is writing to the wireless tag from the outside; and
update the contents of second registered information other than information that allows writing based on the first registered information when priority setting information of the second registered information is not entered and priority setting information of the first registered information indicates main unit priority.

8. A non-transitory computer readable recording medium that stores an information update program that can be executed by a computer that controls an electronic device, wherein
the information update program causes the computer to:
store first registered information in a storage device; store second registered information in a wireless tag;
update contents of the second registered information based on the first registered information;
update contents of information other than information that allows writing when there is writing to the wireless tag from the outside;
update priority setting information of the first registered information to external priority, and
update the contents of second registered information other than information that allows writing when priority setting information of the second registered information is not entered, there is information that allows writing to device information of the second registered information and the priority setting information of the first registered information indicates main unit priority.

* * * * *